(12) United States Patent
Lee

(10) Patent No.: US 6,719,365 B2
(45) Date of Patent: Apr. 13, 2004

(54) INTEGRATED CHANGEABLE INSERT MOLDING FOR AN AUTOMOBILE AND MANUFACTURING METHOD THEREOF

(75) Inventor: Hwan Deok Lee, Busan (KR)

(73) Assignee: Hawngil Lee, Pusan (KR); part interest ( * ) Notice: Subject to any disclaimer, the term of this patent is extended or adjusted under 35 U.S.C. 154(b) by 0 days.

(21) Appl. No.: 10/294,193

(22) Filed: Nov. 14, 2002

(65) Prior Publication Data

US 2003/0218362 A1 Nov. 27, 2003

(30) Foreign Application Priority Data

May 21, 2002 (KR) .................................... 2002-0029070

(51) Int. Cl.[7] .............................................. B60R 13/06
(52) U.S. Cl. .................... 296/210; 296/93; 296/107.04; 296/146.9; 49/475.1
(58) Field of Search .......................... 296/210, 93, 154, 296/213, 107.04, 146.9; 293/128; 49/480.1, 489.1, 490.1, 492.1, 475.1

(56) References Cited

U.S. PATENT DOCUMENTS

| | | | | |
|---|---|---|---|---|
| 3,167,827 A | * | 2/1965 | Alley et al. ................. | 49/492.1 |
| 3,338,007 A | * | 8/1967 | Draplin ........................ | 52/208 |
| 3,572,799 A | * | 3/1971 | Truesdell et al. ........... | 293/128 |
| 3,635,519 A | * | 1/1972 | Foster et al. ................ | 296/210 |
| 3,653,711 A | * | 4/1972 | De Claire et al. .......... | 296/213 |
| 3,770,545 A | * | 11/1973 | Jackson ....................... | 293/128 |
| 3,843,475 A | * | 10/1974 | Kent ............................ | 293/128 |
| 4,363,839 A | * | 12/1982 | Watanabe et al. ........... | 293/128 |
| 4,728,145 A | * | 3/1988 | Benedetto ................... | 296/213 |
| 5,001,865 A | * | 3/1991 | Procton ...................... | 49/489.1 |
| 5,453,309 A | * | 9/1995 | Shanok et al. ............... | 428/31 |
| 6,132,154 A | * | 10/2000 | Easter ......................... | 296/72 |

* cited by examiner

Primary Examiner—D. Glenn Dayoan
Assistant Examiner—Lori L Coletta
(74) Attorney, Agent, or Firm—Gifford, Krass, Groh, Sprinkle, Anderson & Citkowski, P.C.

(57) ABSTRACT

An integrated molding of an automobile and a method of manufacturing thereof, into which separated conventional molding pieces manufactured hitherto in various ways, such as a drip rail molding and a rear piece drip rail molding, are incorporated, and which is integrally manufactured in a unified single manufacturing way including the insert-injection molding and pressing. In the integrated molding, clips, which are separately manufactured from and assembled with conventional moldings and assembled with a vehicle frame or a drip rail attached to the vehicle frame or assembling holes formed through the vehicle frame, are integrally with the integrated molding by insert-injection molding, so that the integrated molding can be assembled with an automobile simply by inserting the clips into holes formed through the vehicle frame. Therefore, the process of manufacturing the integrated molding is simplified, and the integrated molding can effectively prevent wind noise and water-introduction.

5 Claims, 6 Drawing Sheets

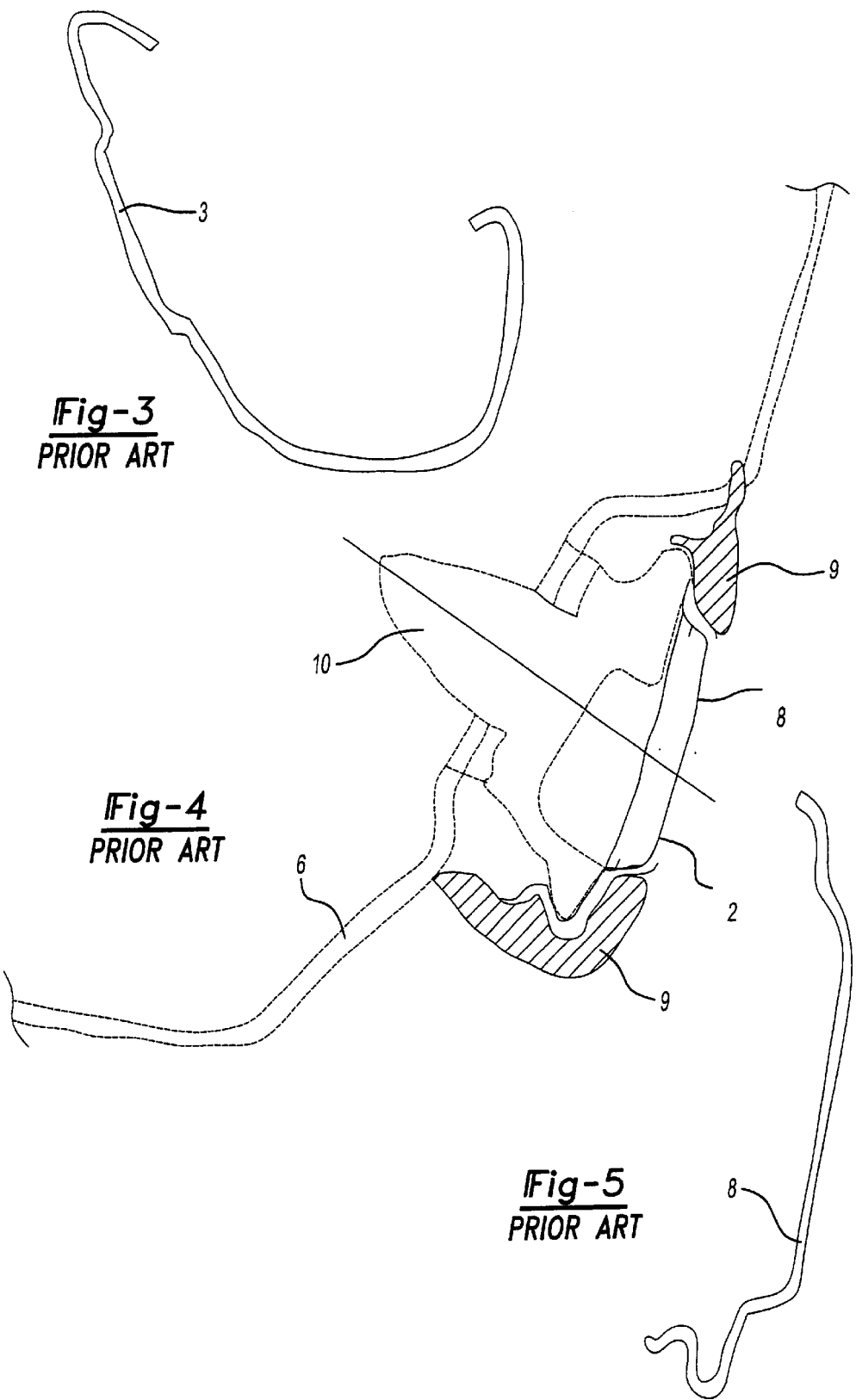

INTEGRATED CHANGEABLE INSERT MOLDING FOR AN AUTOMOBILE AND MANUFACTURING METHOD THEREOF

BACKGROUND OF THE INVENTION

1. Field of the Invention

The present invention relates to a molding attached to the circumference of an upper frame of an automobile above a door of the automobile, and more particularly to an integrated molding and a manufacturing method thereof, into which separated conventional molding pieces manufactured hitherto in various ways such as roll forming and insert molding are incorporated, and which is integrally manufactured in a unified single manufacturing way including the insert-injection molding.

2. Description of the Prior Art

A molding disposed at a side portion of an automobile above a side door of the automobile is a part which closes clearance between the side door and frame of the automobile, thereby preventing introduction of water and wind noise and providing the automobile with an external appearance of a higher class. The molding of the automobile as described above includes a drip rail molding 1 and a rear piece drip rail molding 2, which are separately manufactured and assembled with each other to be attached to the automobile.

The process of manufacturing the drip rail molding 1 includes 27 steps, which will be briefly described hereinafter (see FIGS. 2 and 3).

That is, the drip rail molding 1 is manufactured through the steps of: applying adhesive to one surface of a stainless coil 3 so as to facilitate attachment of polyvinyl chloride (PVC); drying; roll-forming the stainless coil 3 into a desired shape through twelve steps; extruding the PVC 4 onto the molding surface of the roll-formed stainless coil 3; cooling; cutting the coil with the PVC into moldings with a regular length; stretch-bending the molding according to the side frame shape of the vehicle frame so that the molding can be attached to the vehicle frame; pressing (including the steps of cutting the end of the front surface, chamfering the end, notching, and cutting the end of the rear surface); cutting the end portion, which is assembled with the rear piece drip rail molding, by means of a high-speed saw; applying adhesive to the injection portion so as to finish the end of the molding disposed at the front side of the automobile; insert-injection molding the PVC 4 onto the injected end portion of the molding; and assembling a clip 5, which is assembled with the vehicle frame, on the inner surface of the drip rail molding 1 (in this case, the clip is separately manufactured and processed from the injection molding, and then is assembled with the drip rail molding).

In order to assemble the drip rail molding manufactured in the way described above with the vehicle frame 6, a separate drip rail 7 is manufactured and fixed to the vehicle frame by means of spot welding and so on. In this case, the conventional drip rail molding 1 is manufactured through roll forming and extrusion, the drip rail 7 is necessary for the assembling of the drip rail molding and the process of manufacturing the drip rail is included in the process of manufacturing the vehicle frame.

Further, the process of manufacturing the rear piece drip rail molding 2 includes 21 steps, which will be briefly described hereinafter (see FIGS. 4 and 5).

That is, the rear piece drip rail molding 2 is manufactured through the steps of: pressing a stainless coil 8 into a molding shape; attaching protective tape onto the molding surface of the stainless coil 8 (so as to prevent the surface from being scratched while being carried); removing the protective tape and ultrasonic-cleaning the molding surface; drying; applying adhesive to the molding surface in order to facilitate attachment to the stainless coil 8 when injection molding the PVC 9; drying; secondarily applying an adhesive in order to reinforce the attachment force; drying; high-frequency preheating the adhesive by a high-frequency pre-heater; injection molding the PVC 9 onto the molding surface; eliminating unnecessary injection gate and finishing; attaching protective tape; assembling a clip 10 by means of an assembling jig; and spot-welding the joint portion so that the rear piece drip rail molding is aligned with the drip rail molding when it has been assembled.

The rear piece drip rail molding manufactured in the way described above is assembled with the vehicle frame by inserting the clip 10 fixed to the inner surface of the rear piece drip rail molding 2 into an assembling hole formed in advance through the vehicle frame 6.

As described above, the conventional molding for a side door of an automobile includes two separated moldings which are manufactured through complicated method including two different ways of molding, insert-press molding and roll forming molding. Therefore, not only the manufacturing cost is increased, but also wind noise may be generated and the external appearance of the automobile may deteriorate due to a possible gap between the moldings. Moreover, there is a high possibility that alien material is caught in the gap when the automobile is washed (especially by an automatic car-wash machine).

Further, while the drip rail molding is manufactured by roll-forming the stainless coil and protruding the PVC onto the surface of the stainless coil, the rear piece drip rail molding is manufactured by pressing the stainless coil and injection-molding the PVC onto the surface of the stainless coil. Therefore, surfaces of the two moldings may have different colors due to the difference between the ways of forming the stainless coils and the difference between the ways of processing the PVC, the protrusion and the injection-molding.

Furthermore, in order to attach the drip rail moldings to the vehicle frame, drip rails must be separately manufactured and assembled with the vehicle frame, which further complicates the process.

SUMMARY OF THE INVENTION

Accordingly, the present invention has been made to solve the above-mentioned problems occurring in the prior art, and an object of the present invention is to provide an integrated molding of an automobile and a method of manufacturing thereof, into which separated conventional molding pieces manufactured hitherto in various ways are incorporated, and which is integrally manufactured using a unified single manufacturing procedure including insert-injection molding and pressing.

In order to accomplish this object, there is provided a method of manufacturing an integrated molding which is attached to a portion of a vehicle frame above a door of an automobile, the method comprising the steps of: pressing a stainless coil into an integrated coil body having a desired shape corresponding to the integrated molding, the stainless coil having a first surface to which adhesive is applied and a second surface to which protective tape is attached; slightly bending both ends of the integrated coil body; performing a first insert injection molding so as to form a propylene resin body attached to an inner surface of the stainless coil through, the propylene resin body including a first propylene resin layer and a plurality of clips formed integrally with the first propylene resin layer; performing a second insert injection molding so as to form polypropylene resin caps on both side edges of the integrally-attached stainless coil and first polypropylene resin layer, each of the polypropylene resin caps having a second polypropylene resin layer; subjecting the stainless coil and the first and second polypropylene resin layers, formed integrally with each other, to a finishing process, thereby producing the integrated molding; and assembling auxiliary clips, each on each of the clips.

In accordance with another aspect of the present invention, there is provided an integrated molding which is attached to a portion of a vehicle frame above a door of an automobile, the integrated molding comprising: a stainless coil having a first surface to which adhesive is applied and a second surface to which a protective tape is attached, the stainless coil being pressed into an integrated coil body having a desired shape corresponding to the integrated molding, both ends of the integrated coil body being slightly bent; a propylene resin body integrally formed on an inner surface of the stainless coil through a first insert injection molding, the propylene resin body including a propylene resin layer and a plurality of clips formed integrally with the propylene resin layer; polypropylene resin caps integrally formed on both side edges of the integrally-attached stainless coil and the first polypropylene resin layer through a second insert injection molding, each of the polypropylene resin caps having a second polypropylene resin layer, the stainless coil and the first and second polypropylene resin layers, formed integrally with each other, being subjected to a finishing process, thereby producing the integrated molding; and a plurality of auxiliary clips assembled, each on each of the clips.

BRIEF DESCRIPTION OF THE DRAWINGS

The above and other objects, features and advantages of the present invention will be more apparent from the following detailed description taken in conjunction with the accompanying drawings, in which:

FIG. 3 is a side view of a stainless coil employed in the molding shown in FIG. 2;

FIG. 4 is a sectional view taken along line B—B in FIG. 1;

FIG. 5 is a side view of a stainless coil employed in the molding shown in FIG. 4;

DETAILED DESCRIPTION OF THE PREFERRED EMBODIMENTS

Hereinafter, construction and function of an integrated changeable insert molding according to the present invention will be described in detail with reference to the accompanying drawings.

Figure 1:
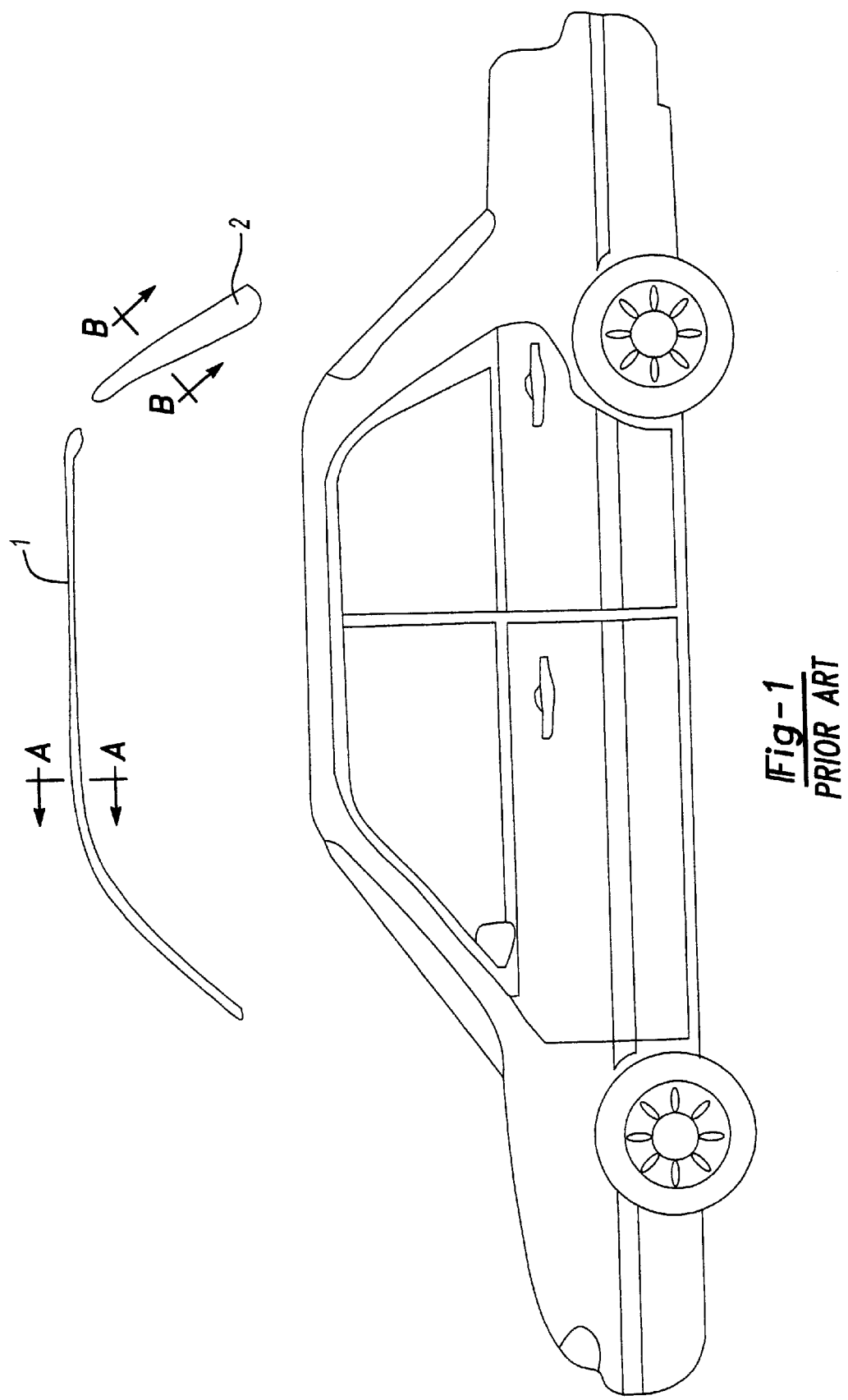
FIG. 1 is a side view of an automobile having conventional drip rail moldings disposed above side doors of the automobile.
Figure 2:
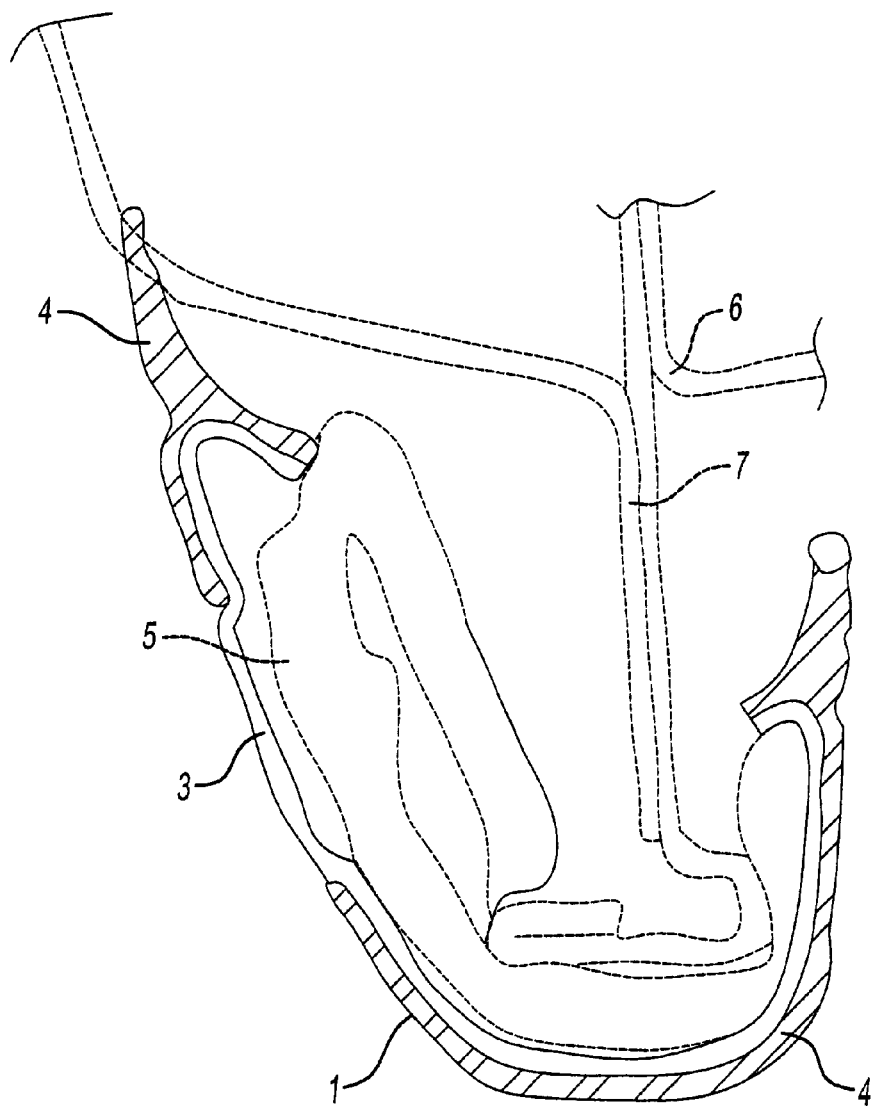
FIG. 2 is a sectional view taken along line A—A in FIG. 1.
Figure 6:
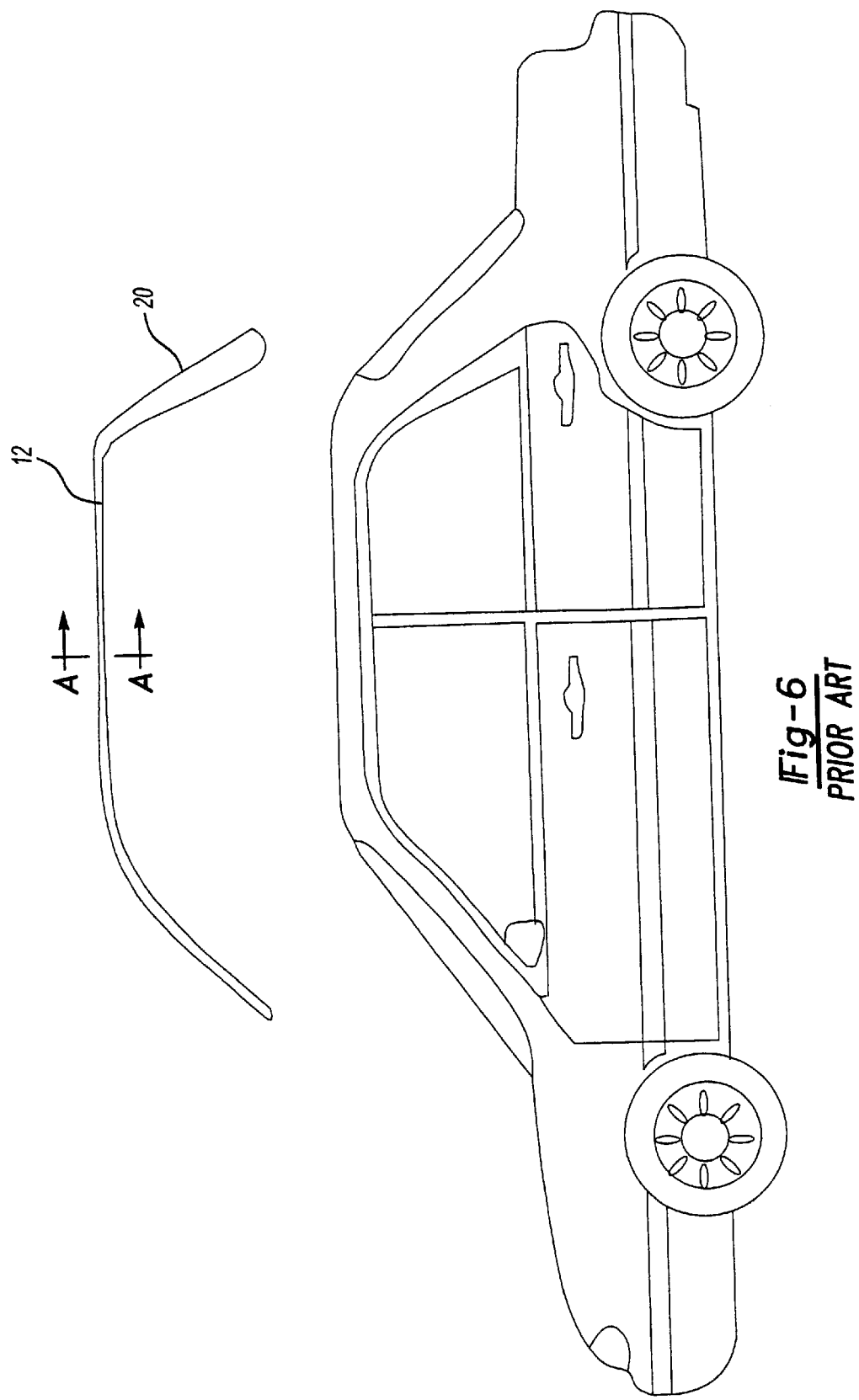
FIG. 6 is a side view of an automobile having an integrated molding according to the present invention, which is disposed above side doors of the automobile.

The molding according to the present invention has one integrated body and is assembled with a frame of an automobile as shown in FIG. 6. A method of manufacturing the integrated molding will be described hereinbelow (see FIGS. 6 to 9).

Figure 7:
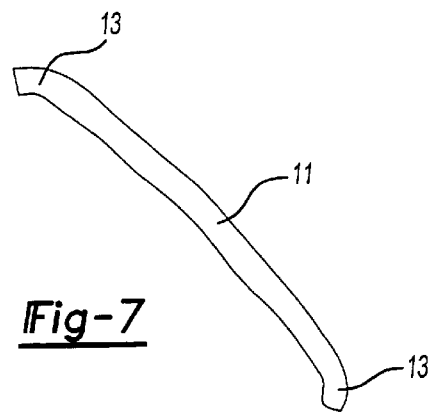
FIG. 7 is a side view of a stainless coil employed in the integrated molding shown in FIG. 6.

First, a stainless coil 11, to one surface of which adhesive is applied in advance and to the other surface of which a protective tape is attached, is pressed into an integrated coil body having a desired shape corresponding to the integrated molding as shown in FIG. 7. This step corresponds to a blanking step by a general press. Thereafter, both ends 13 of the pressed flat stainless coil 11 are slightly bent. This step corresponds to a general press forming step. Thereafter, the stainless coil 11 to which the adhesive has been applied is placed in an injection mold, and the stainless coil 11 is firstly insert-injection molded so that polypropylene resin layer 14 is attached to the inner surface of the stainless coil 11. In this case, the injection mold has a molding shape capable of forming clips 16 integrally with the polypropylene resin layer.

In this case, the shapes of the clips can be formed by means of a slide core of a general injection mold, and the stainless coil 11 and the polypropylene resin layer 14 are attached to each other by adhesive applied on the inner surface of the stainless coil, which is melted by the high temperature of about 200° C. to 240° C. of the injection-molded material (polypropylene resin).

Figure 8:
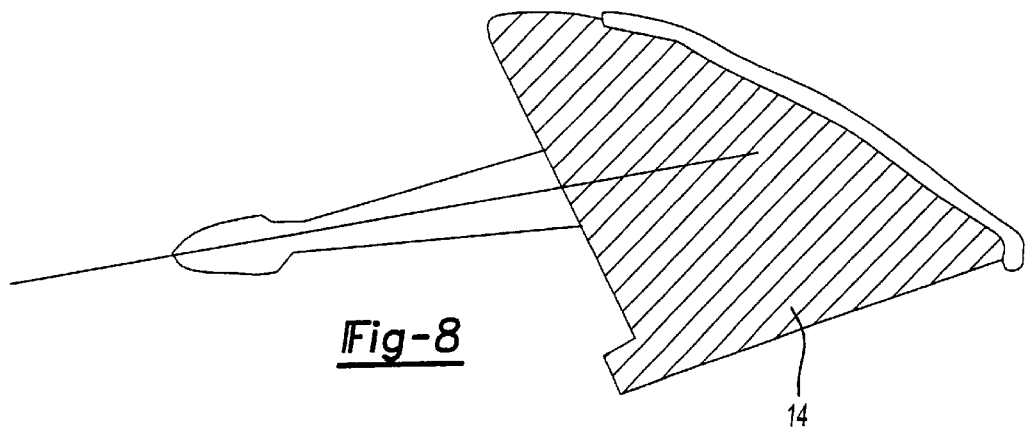
FIG. 8 is a transverse sectional view of a stainless coil and a resin body employed in the integrated molding shown in FIG. 6.

Further, the material used herein may be polypropylene resin containing glass fiber or talc, or polypropylene resin containing elastomer including natural or synthetic rubber (see FIG. 8). Then, the product, one surface of which is first injection-molded with the polypropylene resin 14, is seated in a second injection-mold and secondly injection-molded to form a second injection-molded portion 18.

Figure 9:
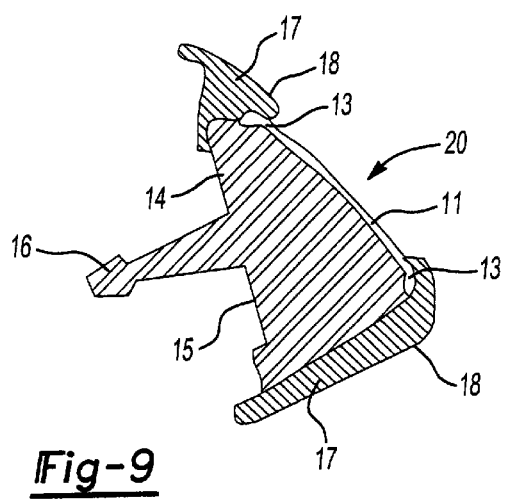
FIG. 9 is a transverse sectional view of the integrated molding shown in FIG. 6.
Figure 10:
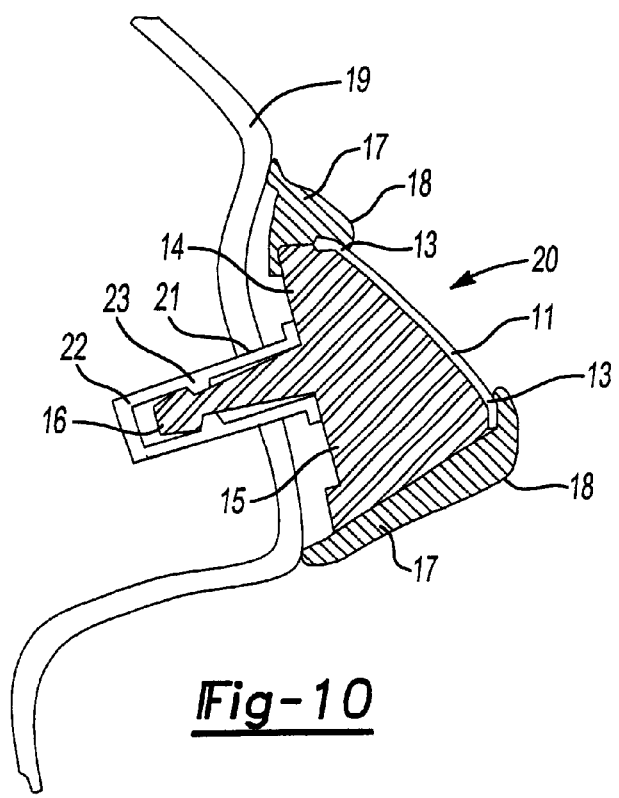
FIG. 10 is a side sectional view showing the state where the integrated molding is assembled with a vehicle frame through an auxiliary clip.
Figure 11:
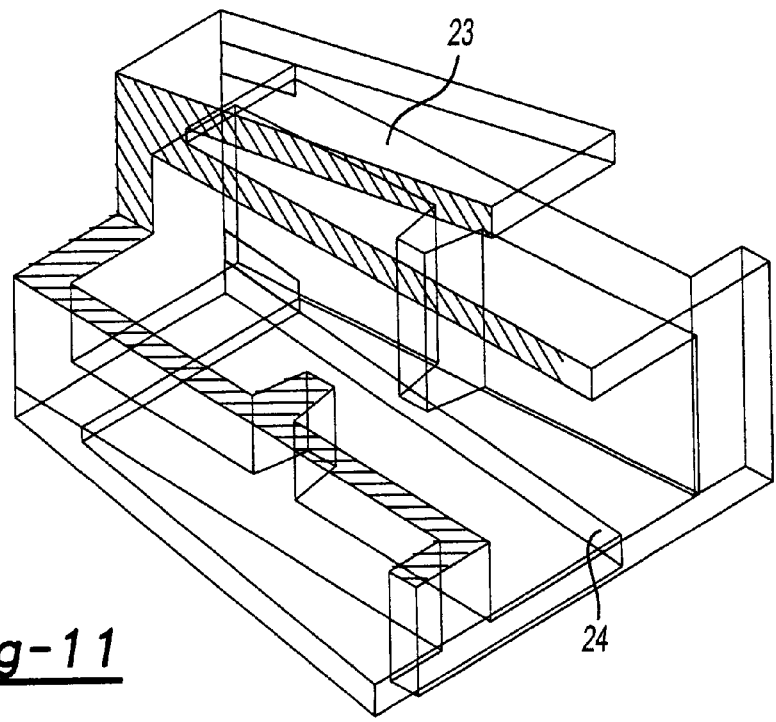
FIG. 11 is a partly cut-out perspective view of the auxiliary clip.

In this case, as the molding material in the second injection-molding, polypropylene resin of the same group as the polypropylene resin used in the first injection-molding is employed, because the materials of the same group can be easily attached to each other and their attachment has strong attachment force even without separately applying adhesive (in this case, the attachment signifies attachment between polypropylene resin and polypropylene resin), as shown in FIG. 9. Thereafter, the attached product is subjected to a finishing process, so that an integrated molding 20 is manufactured.

In consideration of the characteristic of the product, the material used in the first injection molding should be hard. Therefore, it is preferred that polypropylene resin to which reinforcement material such as glass fiber is added is employed in the first injection molding. In contrast, the material used in the second injection molding should feel soft. Therefore, it is preferred that polypropylene to which such material as natural or synthetic rubber has been added is employed in the second injection molding.

Therefore, the integrated molding according to the present invention includes a stainless coil 11 both ends of which are somewhat bent (by press forming), a first polypropylene resin layer 14 attached to one surface of the stainless coil 11, a plurality of clips 16 formed integrally on one surface of and arranged along the longitudinal direction of the first polypropylene resin layer 14, and second polypropylene resin layers 17 covered on portions of the first polypropylene resin layer 14 and the stainless coil 11 other than both ends and exposed portions thereof. Therefore, the integrated molding 20 can be assembled with the vehicle frame by inserting the clips 16 into a plurality of holes 21 formed through the vehicle frame 19.

Meanwhile, the method of manufacturing an integrated changeable molding according to the present invention includes the steps of: pressing a stainless coil 11, to one surface of which adhesive is applied and to the other surface of which a protective tape is attached, into an integrated coil body having a desired shape corresponding to the integrated molding 12 (through blanking by a press); slightly bending both ends of the integrated coil body (through press forming); performing a first insert injection molding so as to form a propylene resin body 15 attached to an inner surface of the stainless coil 11, the propylene resin body 15 including a first propylene resin layer 14 and a plurality of clips 16 formed integrally with the first propylene resin layer 14; performing a second insert injection molding so as to form polypropylene resin caps 18 on both side edges of the integrally-attached stainless coil 11 and first polypropylene resin layer 14, each of the polypropylene resin caps 18 having a second polypropylene resin layer 17; subjecting the stainless coil 11 and the first and second polypropylene resin layers 14 and 17 formed integrally with each other to a finishing process, thereby producing the integrated molding 20; and assembling an auxiliary clip 22 on each of the clips 16.

The integrated molding according to the present invention, which is attached to a portion of vehicle frame above a door of an automobile, includes: a stainless coil 11 having one surface to which adhesive is applied and the other surface to which a protective tape is attached, the stainless coil 11 being pressed into an integrated coil body having a desired shape corresponding to the integrated molding 12 (through blanking by a press), both ends of the integrated coil body being slightly bent (through press forming); a propylene resin body 15 integrally formed on an inner surface of the stainless coil 11 through a first insert injection molding, the propylene resin body 15 including a propylene resin layer 14 and a plurality of clips 16 formed integrally with the propylene resin layer 14; polypropylene resin caps 18 integrally formed on both side edges of the integrally-attached stainless coil 11 and first polypropylene resin layer 14 through a second insert injection molding, each of the polypropylene resin caps 18 having a second polypropylene resin layer 17, the stainless coil 11 and the first and second polypropylene resin layers 14 and 17 formed integrally with each other being subjected to a finishing process, thereby producing the integrated molding 20; and a plurality of auxiliary clips 22 assembled each on each of the clips.

Each of the auxiliary clips 22 has a fitting hole 24 formed inside of the auxiliary clip and an engagement protuberance 23 formed at a top portion of the inner surface of the fitting hole 24. Further, a middle portion of the fitting hole 24 protrudes inward of the fitting hole 24, so that the width of the middle portion of the fitting hole 24 is smaller than the width at any other portion of the fitting hole. Therefore, in the state that the clips are inserted and fixed in fitting holes of the auxiliary clips, the auxiliary clips 22 are inserted into holes formed through the vehicle frame 19, so that the integrated molding is assembled with the vehicle frame 19.

Therefore, the integrated molding according to the present invention has one integrated body and is manufactured by the simplified method described above, which includes only pressing and insert-injection molding. Further, the clips for assembling the molding with the vehicle frame need not be separately prepared and assembled with the molding but can be integrally formed with the integrated molding. Further, in the molding according to the present invention, the auxiliary clips, each of which has a fitting hole formed inside of the clip and an engagement protuberance formed at a middle portion of the inner surface of the fitting hole, so that the width of the fitting hole at the engagement protuberance is smaller than width at any other portion of the fitting hole, are capped on the clips. Therefore, the integrated molding can be assembled with the vehicle frame by inserting the auxiliary clips into holes of the vehicle frame.

Therefore, the integrated molding can be assembled with the vehicle frame by inserting the clips directly into the holes of the vehicle frame or inserting the auxiliary clips capped on the clips into the holes of the vehicle frame.

In the integrated insert molding having the construction described above according to the present invention, separated multiple pieces (at least two pieces) of the conventional molding are incorporated into one integrated body. Therefore, such manufacturing steps in the conventional method of manufacturing the molding as roll forming, applying adhesive several times, extrusion, steps of manufacturing and welding drip rails for and to the vehicle frame, and steps of injection-molding and assembling separate clips can be omitted, so that the method of manufacturing the molding is simplified. Also, the one integrated body of the molding improves the external appearance of the automobile.

Further, in the molding according to the present invention, not only the clips for assembling the molding with the vehicle frame, which are integrally formed at the molding, prevents the molding from being easily separated after being assembled, but also the integrated molding manufactured in a simplified method overcomes various problems of the conventional molding which includes at least two separated pieces of molding bodies manufactured in two different manufacturing methods (roll forming and pressing, and extrusion and injection-molding), such as difference of colors between the separated moldings and assembling clearance between the separated moldings. Moreover, the auxiliary clips capped on the clips and inserted in the hole of the vehicle frame can reduce the clearance between the vehicle and the side door, thereby preventing water from being introduced into the automobile and wind noise from being generated.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An integrated changeable molding which is attached to a portion of a vehicle frame above a door of an automobile, the integrated molding comprising:

an elongated arcuate stainless coil having a width which varies from a first end to a second end of said coil, having a first surface to which adhesive is applied and a second surface to which a protective tape is attached, the stainless coil being pressed into an integrated coil body having a desired shape corresponding to the integrated molding through blanking by a press, both ends of the integrated coil body being slightly bent through press forming;

a polypropylene resin body integrally formed on an inner surface of the stainless coil through a first insert injection molding, the propylene resin body including a propylene resin layer and a plurality of clips formed integrally with the propylene resin layer; and polypropylene resin caps integrally formed on both side edges of the integrally-attached stainless coil and first polypropylene resin layer through a second insert injection molding, each of the polypropylene resin caps having a second polypropylene resin layer, the stainless coil and the first and second polypropylene resin layers formed integrally with each other being subjected to a finishing process, thereby producing the integrated molding.

2. An integrated changeable molding as claimed in claim 1, wherein the integrated molding is assembled with the vehicle frame by inserting the clips in a plurality of holes formed through the vehicle frame.

3. The integrated changeable molding as claimed in claim 1 and comprising a plurality of auxiliary clips, one said auxiliary clip being assembled on each of said clips.

4. An integrated changeable molding as claimed in claim 3, wherein the integrated molding is assembled with the vehicle frame by inserting the auxiliary clips in a plurality of holes formed through the vehicle frame.

5. An integrated changeable molding as claimed in claim 3, wherein each of the auxiliary clips has a fitting hole formed inside of the auxiliary clip and an engagement protuberance formed at a top portion of the inner surface of the fitting hole, the fitting hole having a middle portion protruding inward of the fitting hole, so that a width of the middle portion of the fitting hole is smaller than a width at any other portion of the fitting hole, so that width of the fitting hole at the engagement protuberance is smaller than width at any other portion of the fitting hole, and in a state that the clips are inserted and fixed in fitting holes of the auxiliary clips, the auxiliary clips are inserted into holes formed through the vehicle frame, so that the integrated molding is assembled with the vehicle frame.

\* \* \* \* \*